Jan. 23, 1940.  M. B. LUCKER  2,188,281
BRAKE CONTROL MECHANISM
Filed June 23, 1937   2 Sheets-Sheet 1

Inventor:-
Millard B. Lucker
By:- Cox & Moore attys

Jan. 23, 1940.                M. B. LUCKER                2,188,281
                          BRAKE CONTROL MECHANISM
                           Filed June 23, 1937        2 Sheets-Sheet 2
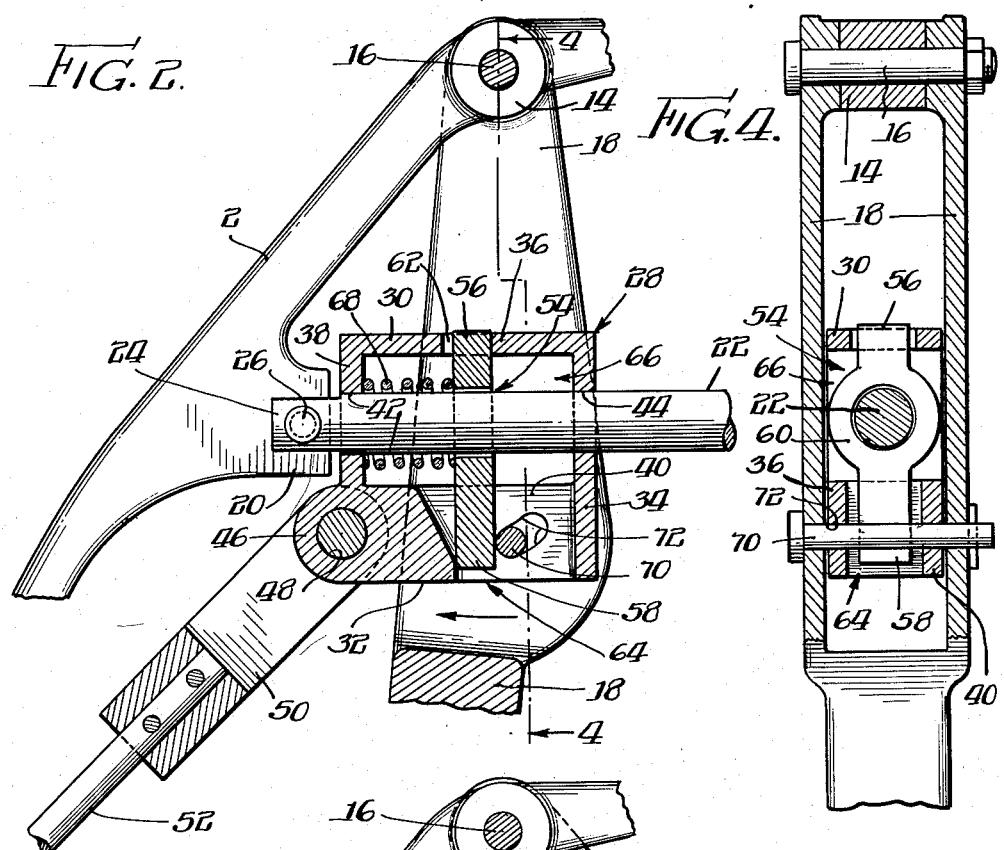
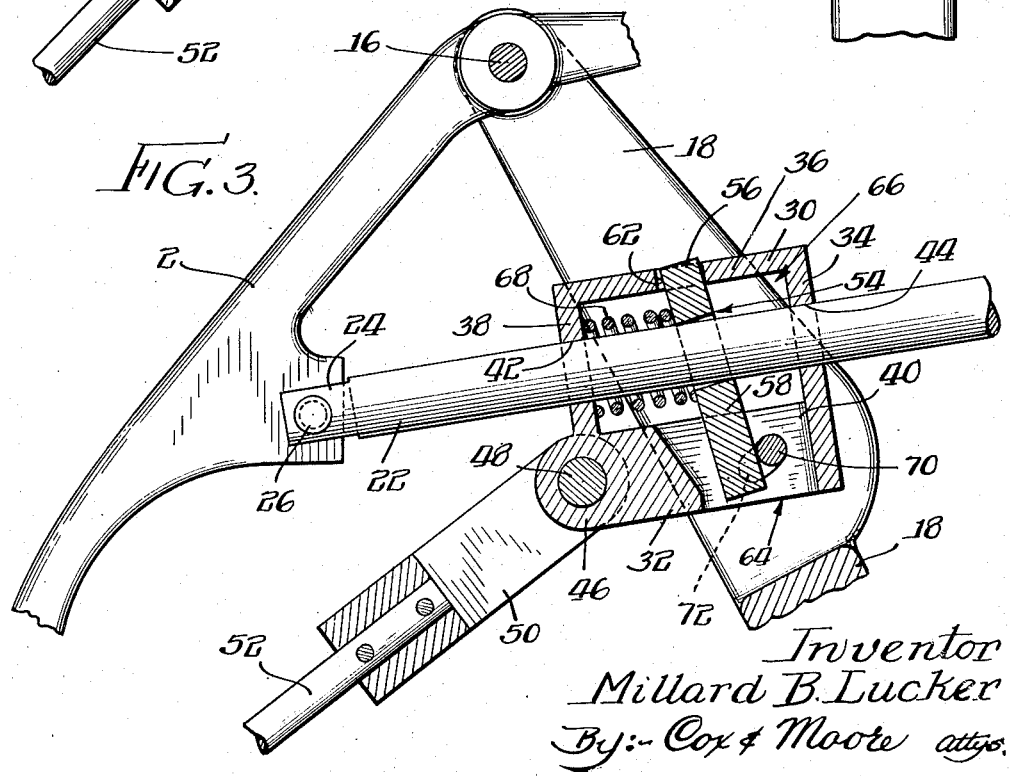
Inventor
Millard B. Lucker
By:— Cox & Moore attys.

Patented Jan. 23, 1940

2,188,281

UNITED STATES PATENT OFFICE 2,188,281

BRAKE CONTROL MECHANISM

Millard B. Lucker, St. Joseph, Mich., assignor to Auto Specialties Manufacturing Company, St. Joseph, Mich., a corporation of Michigan Application June 23, 1937, Serial No. 149,875

10 Claims. (Cl. 74—531)

This invention relates to a brake operating or control mechanism and particularly to such a mechanism for operating the emergency brake of an automobile.

An object of this invention is to provide an inexpensive, readily mountable and rugged brake control mechanism.

Another object of this invention is to provide an easily operable brake control mechanism capable of precise adjustment to set and maintain the brakes in set position.

Another object of the invention is to provide a brake control mechanism of the above character, readily adaptable for mounting on the dash of an automobile.

The common type of emergency brake control mechanism as employed at the present time comprises a hand lever carrying a spring pressed pawl which, in engaging the teeth of a ratchet, maintains the brake in set position. With such mechanism it often happens that when the lever has been moved to the position where the brakes are sufficiently tight, the pawl is between a pair of teeth on the ratchet; therefore the lever must be moved in a releasing direction to cause the pawl to engage the forward tooth of the pair of teeth or it must be moved rearwardly to engage it with the rearward tooth of the pair of teeth. If the lever is released to engage the forward tooth, the brakes will not be set in sufficiently tight position to hold the automobile on a hill and therefore the automobile, when no attendant is present, may become a menace to traffic and may coast down the hill and become wrecked. If the lever is pulled rearwardly to engage the rearward tooth, then the subsequent release of the brake is hard to effect. Furthermore, in the case of the present-type brake control mechanism, the teeth of the ratchet are subject to considerable wear and are often chipped, thereby preventing holding of the brake in set position.

An object of this invention is to eliminate these disadvantages of the present type brake control mechanism by providing a mechanism which is capable of fine adjustment to set and maintain the brakes in locked position and which mechanism is rugged in construction.

Other and further objects and advantages of the invention will be apparent from the following description when taken in connection with the accompanying drawings, wherein:

Fig. 2 is a fragmentary vertical section showing the mechanism in released position.

Fig. 3 is a similar vertical section showing the mechanism in locked position.

Fig. 4 is a fragmentary vertical section taken on the line 4—4 of Fig. 2.

Figure 1:
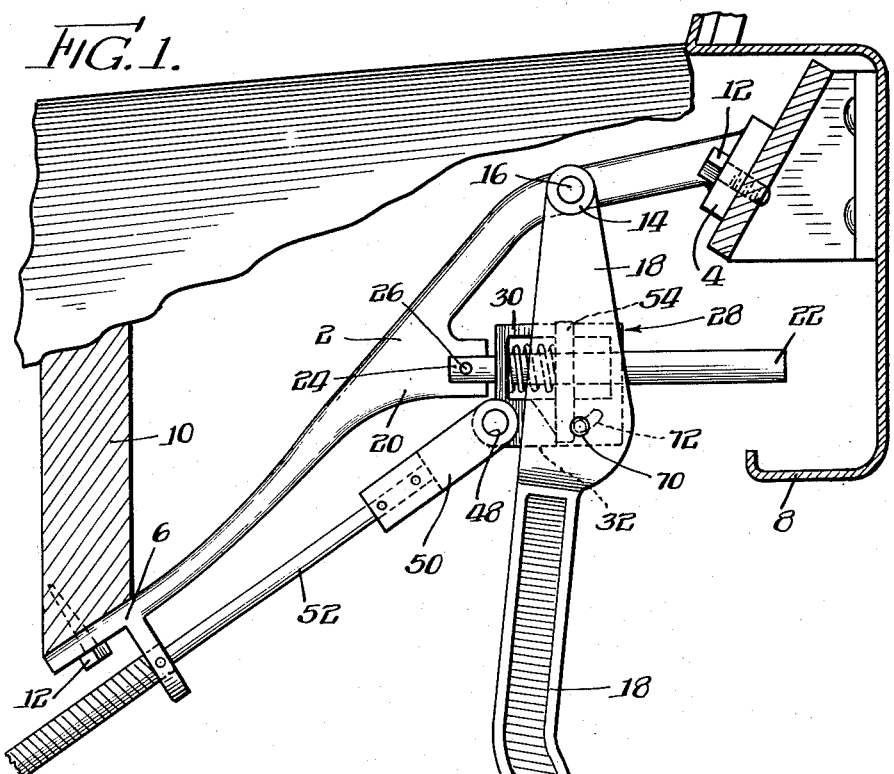
Fig. 1 is a view in elevation of a device embodying the invention and showing the same mounted on the dash of an automobile.

As shown in Fig. 1, an angulated bracket 2 having spaced feet 4 and 6 is secured to the dash 8 and cowl 10 of an automobile, fastening means such as bolts 12 passing through the feet 4 and 6 and a bracket secured to the dash 8 and cowl 10. The bracket 2 is provided adjacent its upper end with an integral boss 14 drilled to receive a mounting stud 16 upon which is loosely journaled a bifurcated operating handle or lever 18. A supporting member, lug or projection 20 is formed integrally with and extends rearwardly from the mid-portion of the bracket 2. A rod 22, having a bifurcated end portion 24 straddling the member 20, is pivoted thereto by a pin or stud 26. An housing or operating member 28 having top and bottom wall portions 30 and 32 and side wall portions 34, 36, 38 and 40, is slidably mounted on the rod 22, which rod passes through alined openings 42 and 44 in the wall portions 34 and 38. The wall 38 is provided with an integrally formed, forwardly extending lug 46 drilled as at 48 to receive an attaching clevis 50 by which the brake operating cable 52 is secured to the member 28. A detent or locking member 54, having spaced lugs 56 and 58 and a central circular portion 60, is provided with a central opening of a diameter slightly greater than the diameter of the rod 22. The detent member 54 is slidably received on the rod 22. The operating member 28 has an opening 62 slightly larger in dimensions than the lug 56 to receive said lug, whereby the detent member 54 may have a slight pivotal movement relative to the operating member 28. The lug 58 of the detent member 54 is received in an elongated slot 64 passing through the bottom wall 32 and communicating with the interior of the operating member 28. The side walls 36 and 40 are provided with enlarged openings 66 for permitting assembly of the mechanism. A spring 68 interposed between the detent member 54 and the wall 38 normally maintains the detent in tilted position relative to the rod 22 whereby to maintain the operating member 28 in locked position. The movement of the detent member 54 to the releasing position is controlled by a stud 70 journaled in the hand lever 18 and slidably received in arcuate slots 72 formed in the walls 36 and 40.

The operation of this mechanism is as follows: A rearward movement of the handle lever 18 to the right or toward the driver causes a movement of the stud 70 in the arcuate slot 72 rearwardly or to the right and thereby releases the detent member 54 which, under the action of the spring 68, tilts or pivots in the opening 62. After the stud 70 reaches its limit of rearward movement, the continued rearward operation of the handle lever 18 causes the operating member 28 to move rearwardly and through the cable or rod 52 to apply the brakes. During this movement, the spring 68 maintains the locking member or detent 64 in the tilted position but as the operating member 28 moves, or tends to move, relative to the locking member 64, the spring 68, which is distorted as shown in Fig. 3, tends to cause the locking member to move in a clockwise direction, thereby permitting the operating member to move along the rod 22 in the brake applying direction. The axis of the central opening in the detent member 54 now being at an angle relative to the axis of the rod 22, the detent member will prevent the housing or operating member from sliding in the opposite or brake releasing direction along the rod 22. The reactive force exerted by the applied brakes through the operating cable 52 will be transmitted by the operating member 28 to the lug 56 of the detent member 54. It will be evident that this force being directed in a direction to the left as seen in Fig. 1, will tend to cause a further tilting of the detent member relative to the rod, thereby tending to maintain the control mechanism in set position.

Release of the brakes is accomplished by moving the handle lever 18 forwardly or to the left away from the driver, the stud 70 engaging the lug 58 and moving along the slot 72 to cause the detent member 54 to rotate in a clockwise direction until the lug 58 engages the forward wall of the opening 64 or the stud 70 reaches the end of its slot 72. In this position of the detent member the axis of the central opening therein is coincident with or parallel to the axis of the rod 22 and the operating member 28 may thereupon be moved forwardly along the rod 22 to release the brakes. So long as the stud 70 is maintained in engagement with the lug 58 the reactive force exerted by the brakes will assist this forward releasing movement of the operating member 28.

Figure 5:
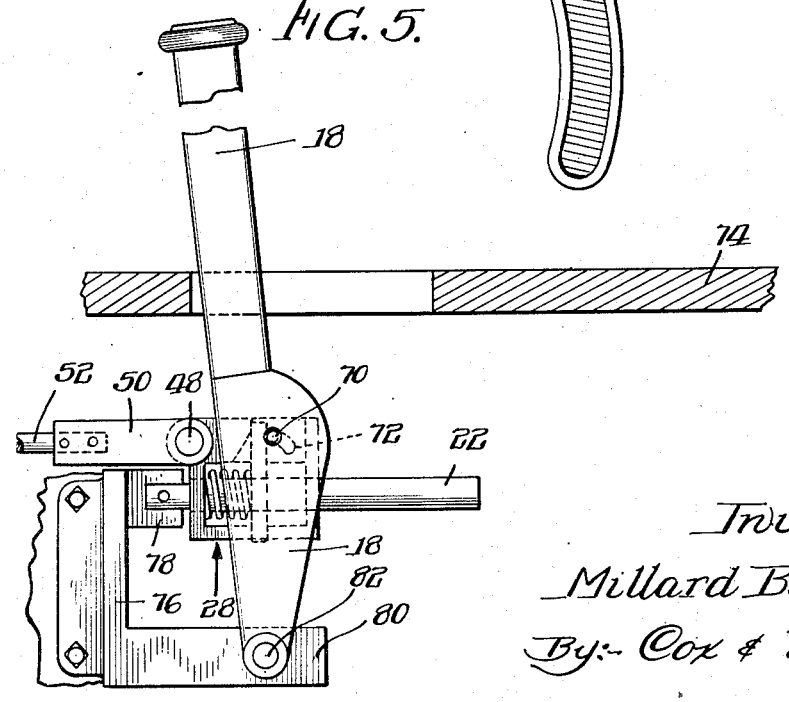
Fig. 5 is a view in elevation showing the mechanism mounted beneath the floor of an automobile.

As shown in Fig. 5, the brake control mechanism of Figs. 1 to 4 may be adapted for mounting beneath the floor member 74 of an automobile by providing a bracket 76 having an integral, rearwardly projecting supporting member 78 upon which the rod 22 is mounted and a foot portion 80 upon which the bifurcated hand lever 18 may be pivoted as at 82. The bracket 76 may be secured in any desired manner to the frame of the automobile or to the transmission casing normally positioned immediately beneath the floor 74 and construction of this form of mechanism is otherwise the same as that shown in Figs. 1 to 4.

It will be seen from the above description that applicant has provided a particularly efficient and rugged brake control mechanism capable of easy manipulation to apply and release the brakes; capable of fine or precise adjustment to set the brakes in locked position and capable of maintaining the brakes in such locked position without danger of release caused by wear of the locking members.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. In a brake control mechanism having a brake applying member, the combination of a fixed bracket, a rod secured to said bracket, an operating member comprising a housing having a plurality of wall portions, a pair of opposite wall portions in said housing having alined openings slidably receiving said rod, a locking member pivotally associated at one end with another wall portion of said housing, said housing having an enlarged opening in the opposite wall portion for slidably receiving the opposite end portion of said locking member, said locking member having an enlarged opening intermediate said end portions for slidably receiving said rod, means connecting the operating member to the brake applying member, resilient means for normally tilting said locking member relative to said rod whereby to lock said operating member and said rod against relative movement in one direction, a manually operable lever pivotally secured to said bracket and means operatively connecting said lever to said locking member for operating the latter to release said rod and operating member for relative movement in the opposite direction.

2. In a brake control mechanism having a brake applying member, the combination of a fixed bracket, a rod secured to said bracket, an operating member comprising a housing having a plurality of wall portions, a pair of opposite wall portions in said housing having alined openings slidably receiving said rod, a locking member pivotally associated at one end with another wall portion of said housing, said housing having an enlarged opening in the opposite wall portion for slidably receiving the opposite end portion of said locking member, said locking member having an enlarged opening intermediate said end portions for slidably receiving said rod, means connecting the operating member to the brake applying member, resilient means for normally tilting said locking member relative to said rod whereby to lock said operating member and said rod against relative movement in a brake releasing direction, a manually operable lever pivotally secured to said bracket, a pin secured to said lever, said housing having an arcuate slot adjacent one end of said locking member to receive said pin whereby upon operation of said lever in the brake releasing direction, said pin engages said locking member and releases said rod from said operating member.

3. In a brake control mechanism having a brake applying member, the combination of a fixed bracket, a rod secured to said bracket, an operating member comprising a housing having a plurality of wall portions, a pair of opposite wall portions in said housing having alined openings slidably receiving said rod, a locking member pivotally associated at one end with another wall portion of said housing, said housing having an enlarged opening in the opposite wall portion for slidably receiving the opposite end portion of said locking member, said locking member having an enlarged opening intermediate said end portions for slidably receiving said rod, means connecting the operating member to the brake applying member, a spring encircling said rod and interposed between one wall portion of said housing and said locking member for normally tilting said locking member relative to said rod whereby to lock said operating member and said rod against relative movement in one direction, a manually operable lever pivotally secured to said bracket and means operatively connecting said lever to said locking member for operating the latter to release said rod and operating member for relative movement in the opposite direction.

4. In a brake control mechanism having a brake applying member, the combination of a fixed supporting bracket, a bar extending from said bracket, a locking member having an enlarged opening receiving said bar, an operating member slidable longitudinally of said bar and forming a housing for said locking member, said housing having an opening in one wall for receiving an edge portion of the locking member whereby said locking member is moved longitudinally of said bar by said operating member, means operatively connecting the operating member to the brake applying member, said locking member being tiltable on said bar whereby to lock said operating member and said bar against relative movement in a brake releasing direction, means for manually moving said operating member in a brake applying direction, and means carried by said last mentioned means for operating said locking member to release said bar and operating member for relative movement in the brake releasing direction.

5. In a brake control mechanism having a brake applying member, the combination of a fixed supporting bracket, a bar extending from said bracket, a locking member having an enlarged opening receiving said bar, an operating member slidable longitudinally of said bar and forming a housing for said locking member, said housing having an opening in one wall for receiving an edge portion of the locking member whereby said locking member is moved longitudinally of said bar by said operating member, means operatively connecting the operating member to the brake applying member, said locking member being tiltable on said bar whereby to lock said operating member and said bar against relative movement in a brake releasing direction, a manually operable lever pivotally secured to said bracket and means carried by said lever and operatively connected to said locking member for operating the latter to release said bar and operating member for operating movement in the brake releasing direction.

6. In a brake control mechanism having a brake applying member, the combination of a fixed bracket, a rod pivoted to said bracket, an operating member shiftably mounted on said rod and adapted to be connected to the brake applying member, manually operable means for shifting said operating member on said rod, a friction detent slidably mounted on the rod and tiltable relative thereto, an operative connection between the detent and the operating member for tilting the detent into gripping engagement with the rod upon movement of the operating member to a brake setting position, and means operatively associated with the manually operable means for releasing the friction detent from gripping engagement with the rod upon operation of said manually operable means in a brake releasing direction.

7. In a brake control mechanism having a brake applying member, the combination of a fixed bracket, a smooth bar secured to said bracket, an operating member slidably mounted on said bar and adapted to be connected to the brake applying member, a friction locking detent having an enlarged opening slidably receiving said rod, means pivotally connecting said locking detent to said operating member to permit the operating member to cant the locking detent to cause the bar to bind in the opening of said locking detent whereby said operating member and bar are locked against relative movement in a brake releasing direction, manually operable means for sliding said operating member along said bar, and means operatively connected to said manually operable means for uncanting said locking detent to release said operating member for movement in a brake releasing direction.

8. In a brake control mechanism having a brake applying member, the combination of a fixed bracket, an operating member comprising a housing adapted to be connected to said brake applying member, a friction locking detent within said housing, a rod secured to the bracket and passing through said housing, said detent being slidably mounted on said rod, said operating member being pivotally connected to said detent for forcibly canting the detent into gripping engagement with the rod when the brake applying member is in brake setting position to lock the operating member against movement in a brake releasing direction, manually operable means for moving said operating member between brake setting and releasing positions, and means carried by said manually operable means and engageable with said locking detent for uncanting the latter to release said operating member for movement in the brake releasing position.

9. In a brake control mechanism having a brake applying member, the combination of a fixed bracket adapted to be secured to the dash of an automobile, a rod pivotally secured to said bracket, an operating member mounted on said rod and slidable longitudinally of said rod, a friction detent pivotally associated with said operating member and having an enlarged opening for receiving said rod, said detent being tiltable on said rod to grip the rod and lock the operating member against movement on said rod in a brake releasing direction, means normally urging said detent into a locking position, a manually operable lever for sliding said operating member along said rod, a lost motion operative connection between said manually operable lever and said operating member for permitting said lever to be moved in a brake releasing direction relative to the operating member and a release member carried by said lever and adapted to engage said detent upon such relative movement of the lever in the brake releasing direction to release the detent from gripping engagement with the rod.

10. In a brake control mechanism having a brake applying member, the combination of a fixed support, a bar projecting from said support, an operating member shiftably mounted on said bar and adapted to be connected to the brake applying member, a friction detent operatively connected to said operating member for movement therewith to brake applying position and for canting thereby on said bar to lock said operating member against movement along said bar in a brake releasing direction, and a manually operable lever operatively connected to said operating member and to said detent for moving said operating member in a brake applying direction and for releasing said detent from gripping engagement with the rod upon movement of the lever in a brake releasing direction.

MILLARD B. LUCKER.